United States Patent

Sawada et al.

Patent Number: 5,316,814
Date of Patent: May 31, 1994

[54] OPTICAL INFORMATION RECORDING MEDIUM

[75] Inventors: Yasuo Sawada, Machida; Toru Yashiro, Yokosuka; Yutaka Ueda, Yokohama, all of Japan

[73] Assignee: Ricoh Company, Ltd., Tokyo, Japan

[21] Appl. No.: 881,857

[22] Filed: May 12, 1992

[30] Foreign Application Priority Data

May 14, 1991 [JP] Japan ................................. 3-138475
Jul. 12, 1991 [JP] Japan ................................. 3-198894
Aug. 30, 1991 [JP] Japan ................................. 3-245013

[51] Int. Cl.$^5$ .............................................. B32B 3/00
[52] U.S. Cl. .......................................... 428/64; 428/65; 428/457; 428/913; 430/945; 346/76 L; 346/135.1
[58] Field of Search ............... 428/64, 65, 457, 913; 430/945; 346/76 L, 135.1

[56] References Cited

U.S. PATENT DOCUMENTS 4,651,172  3/1987  Watanabe et al. ................. 428/64
4,940,618  7/1990  Hamada ............................ 428/64
5,206,063  4/1993  Westerhout ....................... 428/64

*Primary Examiner*—Patrick J. Ryan
*Assistant Examiner*—Elizabeth Evans
*Attorney, Agent, or Firm*—Cooper & Dunham

[57] ABSTRACT

An optical information recording medium including a ROM area and a recordable area is composed of a light-transmitting substrate with prepits and/or guide grooves formed on the surface thereof, a light absorption layer serving as a recording layer which is composed of a dye as the main component overlaid on the light-transmitting substrate, and a light reflection layer which is composed of metallic film overlaid on the light absorption layer. The light absorption layer of this optical information recording medium is formed on the substrate by coating a solution composed of a dye and a solvent of a mixture of a fluoridated alcohol of formula (I) and an alcohol of formula (II):

$$A-CH_2OH \qquad (I)$$

wherein A represents $CF_3-$ or $H(CF_2-CF_2)_l-$ in which l is an integer of 1 to 3; and $$HO-CH_2CH_2-OR \qquad (II)$$

wherein R represents $C_nH_{2n+1}-$,

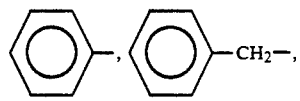

H, or $C_mH_{2m+1}-O-C_nH_{2n}-$ in which n is an integer of 1 to 4, and m is an integer of 1 to 4.

10 Claims, 4 Drawing Sheets

OPTICAL INFORMATION RECORDING MEDIUM

BACKGROUND OF THE INVENTION

1. Field of the Invention

The present invention relates to an optical information recording medium, more particularly to a write-once-type compact disc having a ROM area and a recordable area, and a method of fabricating the write-once-type compact disc.

2. Discussion of Background

Recently, development of write-once-type compact discs (CDs) has advanced actively. Unlike the conventional CDs, information can be recorded in the write-once-type CDs by the user. Moreover, the write-once-type CDs are characterized in that the recorded information can be reproduced by a commercially available CD player because the recording signals for the write-once-type CDs conform to the conventional CD standards.

Japanese Laid-Open Patent Application No. 2-42652 discloses one method of fabricating such a write-once-type CD in which a light absorption layer is formed on a substrate by coating dye on the substrate by the spin coating method and in which a metallic reflection layer is provided on the above formed light absorption layer.

Japanese Laid-Open Patent Application No. 2-132656 describes a write-once-type CD for which recorded signals conforming to the conventional CD standards can be fabricated by adequately adjusting the complex index of reflection of the light absorption layer and the thickness thereof.

Such a write-once-type CD can be utilized in such a fashion to include (a) a ROM area in which information pits are preformed and (b) a recordable area in which information is to be recorded later as desired by the user.

In order to form such a ROM area in the write-once-type CD, the following two methods can be employed:

(i) A CD with the entire surface thereof being recordable, which consists of a recordable ROM area and another recordable area is fabricated. The manufacturer of the CD provides the user with the necessary information recorded in the ROM area before sale.

(ii) Pits for recording information are formed in an area corresponding to a ROM area of a CD in a step for producing a substrate thereof in the same manner as in the conventional CDs, and then the remaining area in which pits are not formed is provided as a recordable area that can be used by the user.

The previously mentioned Japanese Laid-Open Patent Application No. 2-42652 discloses a CD, which includes a ROM area 5 and a recordable area 6 formed by the above-mentioned method (ii) as shown in FIG. 2A and FIG. 2B. This CD is composed of a transparent substrate 11, a light absorption layer 12 comprising a dye formed in the recordable area 6 on the substrate 11, a reflection layer 13 formed not only in the ROM area 5, but also on the light absorption layer 12, and a protective layer 14 which covers the light reflection layer 13. In this CD, the light absorption layer 12 is provided only in the recordable area 6, not in the ROM area 5. In other words, the "separate coating" method is employed when the recordable area of the CD is coated with the dye.

The reasons for employing the separate coating method are considered as follows: When the surface of a substrate 21 having pits or grooves is coated with the dye composition using the spin coating method, the pits or the grooves are generally filled with the dye composition in such a form as shown in FIG. 3A, in which the thickness of the coated dye composition layer 22a in the bottom portion of the pit is much thicker than that of the coated dye composition layer 22a in the land portion of the pit. In other words, it is extremely difficult to uniformly coat the pit with the dye composition in the form of a dye composition layer 22b as shown in FIG. 3B.

In particular, pits formed on the surface of the ROM area are substantially the same as those formed on conventional CDs, and therefore, the signals which conform to the CD standards can be obtained when a reflection layer is directly formed on the ROM area. However, if the reflection layer is provided after coating the ROM area with the dye composition in such a fashion as shown in FIG. 3A, the shapes of the pits are substantially changed, the modulation degree of the recording medium is reduced, that is, the amplitude of signals is substantially decreased. The result is that the signals conforming to the CD standards cannot be obtained.

Thus, the separate coating method is employed in Japanese Laid-Open Patent Application No. 2-42652.

However, such a separate coating method has the following shortcomings:

(1) Although the light absorption layer is generally formed by the spin coating method, it is practically impossible to strictly coat only the recordable area with a dye composition, without adverse effects to the ROM area from the dye composition. Therefore, as a matter of fact, it occurs that part of the ROM area is coated with the dye composition or part of the recordable area is not coated with the dye composition. As a result, these improperly coated or uncoated parts cause improper function of the recording medium.

(2) The coated light absorption layer tends to become thicker in a portion close to the border with the ROM area than in the other portion, so that the reflectance of the light beam is not up to the CD standards. Such a portion does not properly function as the light absorption layer and cannot be used. Furthermore, such unusable portions make up a large area because the dye composition cannot always be uniformly coated onto the substrate. This leads to a substantial decrease in the recording capacity of the CD.

The substrate of the optical information recording medium, with preformed pits and grooves, is generally formed by injection molding, using a thermoplastic resin such as polycarbonate or polymethyl methacrylate. When a dye composition is dispersed in a solvent and coated onto such a substrate by the spin coating method, the solvent contained in the dye dispersion, depending on the kind of the solvent, may dissolve the surface of the substrate. If this occurs, the pits or the grooves are caused to disappear and the light reflectance of the substrate significantly decreases. Therefore, it is necessary to use a solvent which does not dissolve the substrate material, but dissolves the dye.

Japanese Laid-Open Patent Application No. 63-159090 discloses a fluorinated alcohol which can be employed as such a solvent that does not dissolve the substrate but dissolves the dye. The solvent containing the fluorinated alcohol has excellent properties as a coating liquid for the formation of the light absorption layer. However, when such a coating liquid is used, the pits or the grooves are filled with the dye composition as illustrated in FIG. 3A.

SUMMARY OF THE INVENTION

It is therefore a first object of the present invention to provide an optical information recording medium including a ROM area and a recordable area, which can be formed by coating these areas completely with a dye composition, without separately coating the recordable area apart from the ROM area with the dye composition, that is, without employing the so-called "separate coating method" for coating the dye composition onto the substrate.

A second object of the present invention is to provide a method of fabricating an optical information recording medium of the above-mentioned type, which includes a ROM area and a recordable area.

The first object of the present invention can be achieved by an optical information recording medium including a ROM area and a recordable area, which comprises (1) a light-transmitting substrate with preformed pits (hereinafter referred to as prepits) and/or guide grooves formed on the surface thereof, the prepits being in the ROM area, and the guide grooves being in the recordable area, (2) a light absorption layer serving as a recording layer which comprises a dye as the main component overlaid on the light-transmitting substrate, and (3) a light reflection layer comprising a metallic film overlaid on the light absorption layer, each of the prepits having a substantially trapezoid cross-sectional profile, the optical phase difference $\Delta S_1$ between a prepit portion and a non-prepit portion, represented by Equation: $\Delta S_1 = 2\{n_1 d_1 - d_2\}$, satisfying the condition of $2.5\lambda/8 < \Delta S_1 < 4\lambda/8$, wherein $d_1$ is the depth of the prepit, $d_2$ is the depth of the prepit portion at the interface between the light absorption layer and the light reflection layer, $n_1$ is the real number of the complex index of reflection of the light-transmitting substrate, $n_2$ is the real number of the complex index of reflection of the light absorption layer, and $\lambda$ is the wavelength of a light beam for reproduction, each of the guide grooves having a substantially V-shaped cross-sectional profile, and the optical phase difference $\Delta S_2$ between a groove portion and a land portion, represented by Equation: $\Delta S_2 = 2\{n_1 d_1' - n_2(d_1' - d_2')\}$, satisfying the condition: $0.5\lambda/8 < \Delta S_2 < 2.5\lambda/8$, wherein $d_1'$ is the depth of the guide groove and $d_2'$ is the depth of the guide groove portion at the interface between the light absorption layer and the light reflection layer.

The second object of the present invention can be achieved by a method of fabricating the above-mentioned optical information recording medium, in which the light absorption layer is formed by coating a solution comprising as the main components a dye and a solvent comprising a mixture of a fluorinated alcohol of formula (I) and an alcohol of formula (II), with the amount of the fluorinated alcohol of the formula (II) being 20 wt.% or less with respect to the amount of the fluorinated alcohol of the formula (I):

A—CH$_2$OH  (I)

wherein A represents CF$_3$— or H(CF$_2$—CF$_2$)$_l$— in which l is an integer of 1 to 3; and

HO—CH$_2$CH$_2$—OR  (II)

wherein R represents C$_n$H$_{2n+1}$—,

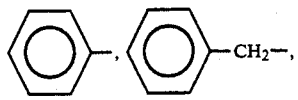

H, or C$_m$H$_{2m+1}$—O—C$_n$H$_{2n}$—in which n is an integer of 1 to 4, and m is an integer of 1 to 4.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The optical information recording media of the present invention will now be explained with reference to the accompanying drawings.

Figure 1A:
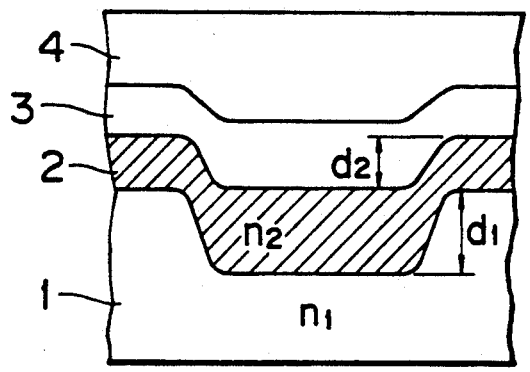
FIG. 1A and FIG. 1B are cross-sectional views of an example of an optical information recording medium according to the present invention, in particular, FIG. 1A showing a pit portion, and FIG. 1B showing a guide groove portion.
Figure 1B:
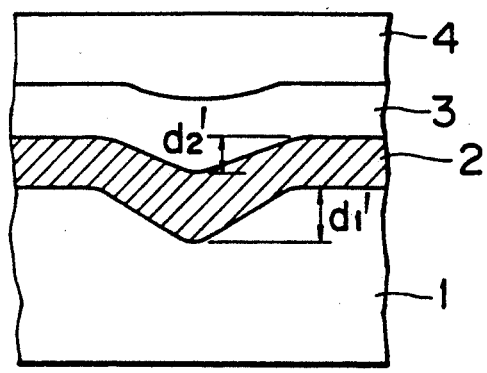
Figure 2A:
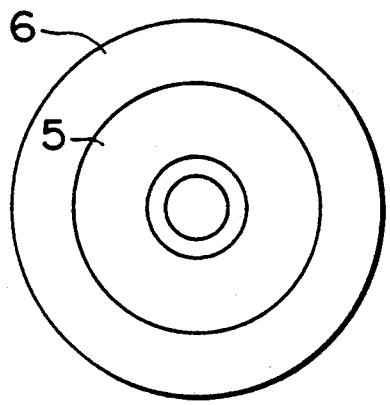
FIG. 2A and FIG. 2B are respectively a plan view and a cross-sectional view of a conventional optical information recording medium in which an optical absorption layer is not provided in a ROM area, but only in a recordable area.
Figure 2B:
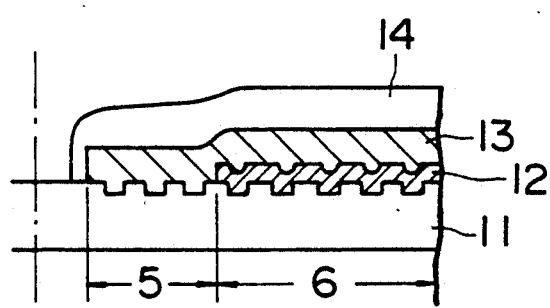
Figure 3A:
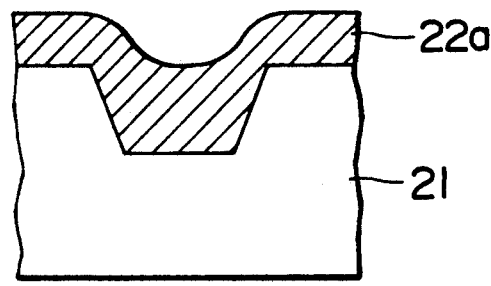
FIG. 3A is a cross-sectional view of a dye composition layer coated to a non-uniform thickness along a pit or a groove with which the pit or groove is substantially filled.
Figure 3B:
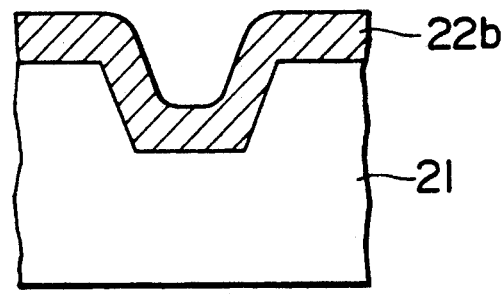
FIG. 3B is a cross-sectional view of a dye composition layer coated to a uniform thickness along a pit or a groove.

FIGS. 1A and 1B are cross-sectional views of the structure of an example of an optical information recording medium according to the present invention. FIG. 1A shows a pit portion, and FIG. 1B shows a groove portion.

This optical information recording medium comprises a transparent substrate 1, and a light absorption layer (or a dye composition layer) 2 serving as a recording layer, a light reflection layer 3, and a protective layer 4 which are successively overlaid on the substrate 1.

Further this optical information recording medium includes both a ROM area and a recordable area. In the present invention, the thickness of the dye composition layer of a pit portion and that of the dye composition layer of a non-pit portion in the ROM area, and the thickness of the dye composition layer in the groove portion and that of the dye composition layer of a land portion in the recordable area can be controlled as follows:

As shown in FIG. 1A, the optical phase difference $\Delta S_1$ between a prepit portion and a non-prepit portion of the optical information recording medium, represented by Equation: $\Delta S_1 = 2\{n_1 d_1 - n_2(d_1 - d_2)\}$, is caused to satisfy the condition of $2.5\lambda/8 < \Delta S_1 < 4\lambda/8$, wherein $d_1$ is the depth of the prepit, $d_2$ is the depth of the prepit portion at the interface between the light absorption layer 2 and the light reflection layer 3, $n_1$ is the real number of the complex index of reflection of the light-transmitting substrate 1, $n_2$ is the real number of the complex index of reflection of the light absorption layer 2, and $\lambda$ is the wavelength of a light beam for reproduction; furthermore, as shown in FIG. 1B, the optical phase difference $\Delta S_2$ between a groove portion and a land portion, represented by Equation: $\Delta S_2 = 2\{n_1 d_1' - n_2(d_1' - d_2')\}$, is caused to satisfy the condition $0.5\lambda/8 < S_2 < 2.5\lambda/8$, wherein $d_1'$ is the depth of the guide grooves and $d_2'$ is the depth of the guide groove portion at the interface between the light absorption layer 2 and the light reflection layer 3.

The reasons why the thickness of each layer has to be controlled as described above will now be explained.

Figure 4:
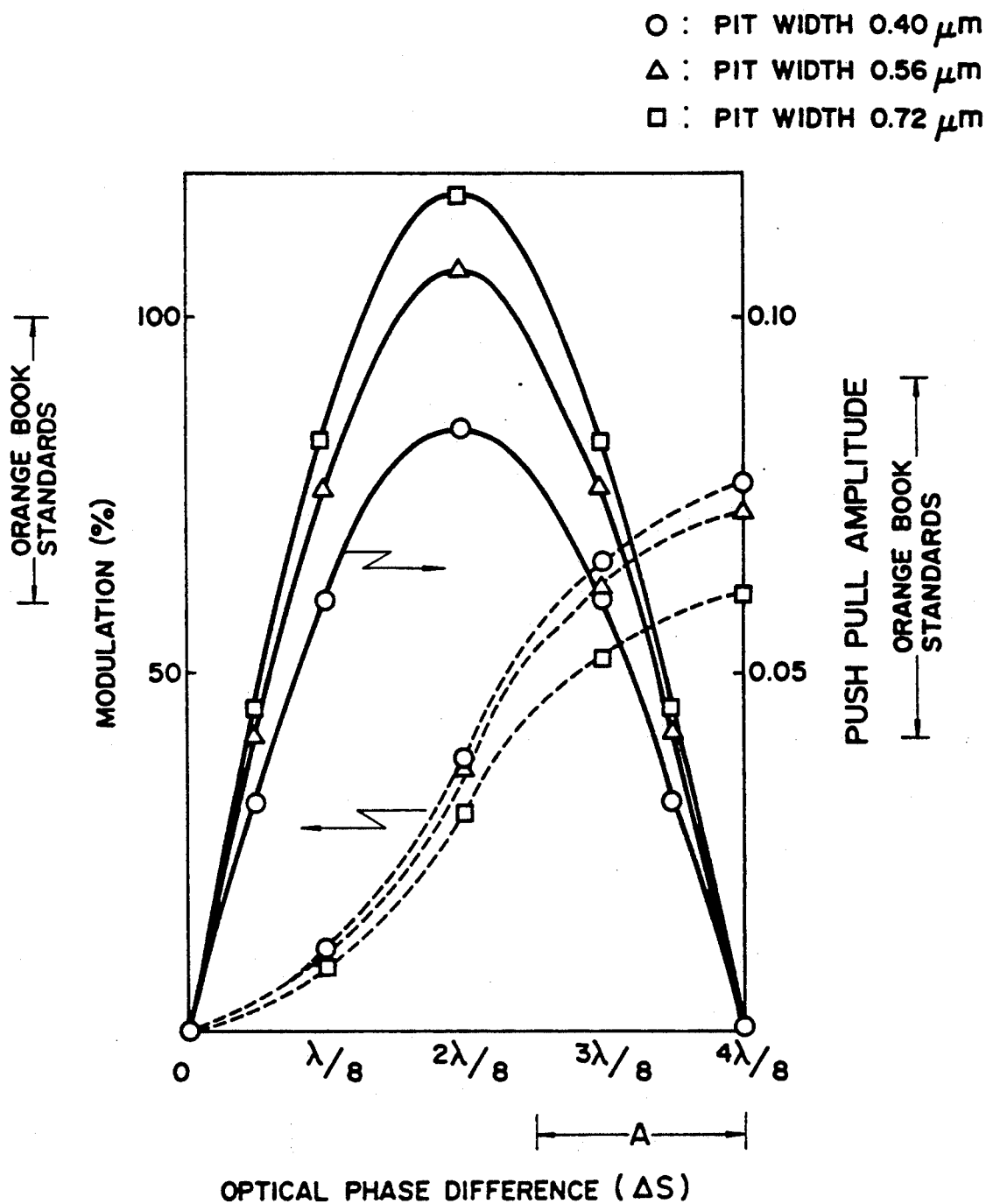
FIG. 4 is a graph showing the relationships among the cross-sectional profile of a pit of an optical information recording medium, the PPA and the modulation degree of the recording medium.

FIG. 4 is a graph showing the relationships among the cross-sectional profile shape of the pit portion, Push Pull Amplitude (PPA) ($|I_1 - I_2|/I top$) wherein ($I_1 - I_2$) is the magnitude (P—P) of the push pull signals, and Itop is the maximum amplitude of 11T signals, and the modulation of the 11T signals, obtained by simulations and experiments.

In the pit portion, when the optical phase difference $\Delta S_1$ is adjusted so as to be within the range A shown in FIG. 4, the Orange Book Standards (the OB standards) (in which PPA=0.04 to 0.09, and the modulation degree>60.0%) can be satisfied. The phase difference caused by the depth of the pit of the substrate 1, represented by $-2n_1 d_1$, may be set either within the range A or outside the range A. When the above-mentioned $-2n_1 d_1$ is set outside the range A, the coating of the dye composition is controlled in such a manner that the overall phase difference $\Delta S$ is within the range A by the phase difference $-2n_2(d_1 - d_2)$, determined by the difference in the film thickness of the coated dye composition layer between that in the pit portion and that in the non-pit portion. Generally the coated dye composition layer in the pit portion is thicker than that in the non-pit portion, so that the above-mentioned phase difference determined by the difference of the film thickness is of a negative value or minus. Therefore, the phase difference in the pit portion is generally set in the range A or in the range larger than the range A in the FIG. 4.

It is possible to set $\Delta S$ in the range A by the phase difference determined by the difference of the film thickness, by adjusting the phase difference caused by the pit to a relatively large value, namely by significantly increasing the depth of the pit, for instance, to 2000 Å to 3000 Å. However, in such a case, unless the dispersion of the difference in the film thickness is minimized, $\Delta S$ cannot be set within the range A.

For instance, when the depth of the pit is 3000 Å, the difference in the film thickness is about 1080 Å ($n_2 = 2.7$). Therefore, the dispersion of the differences in the film thickness has to be limited to ±6% in order to set $\Delta S$ in the range A.

It is preferable that the difference in the film thickness be made as small as possible, because the recordable area is coated at the same time the ROM area is coated, and the phase difference between the groove portion and the land portion has to be set in a range mentioned below.

More specifically, it is preferable that the above-mentioned difference in the film thickness be $0 \leq n_2(d_1 - d_2) \leq \lambda/8$. In this case, it is necessary that the relationship $2.5\lambda/16 < n_1 d_1 < 6\lambda/16$ be satisfied in order to set $d_1$ in the range A. When the difference in the film thickness is 0, i.e., $n_2(d_1 - d_2) = 0$, that is, when the dye composition is uniformly coated along the shape of the pit, $d_1$ may be set near the center of the range A.

In the present invention, it is preferable that the prepit formed on the substrate of the optical information recording medium have a substantially trapezoid cross-sectional profile. This is because the pit portion is deeper than the groove portion, the setting of $d_1$ is possible by resist, and the pit can be easily formed by stamping molding.

Figure 5:
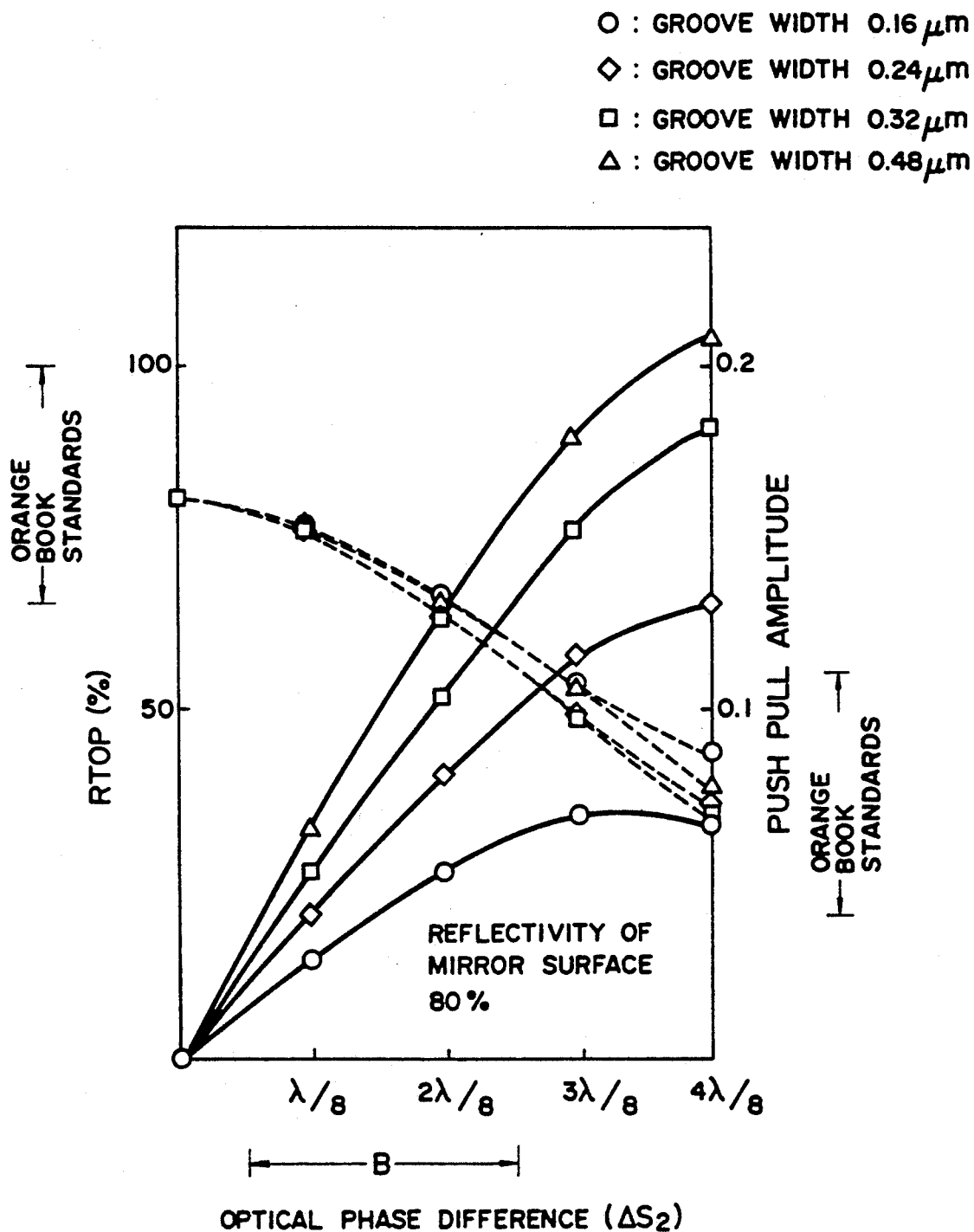
FIG. 5 is a graph showing the relationships among the cross-sectional profile of a groove of an optical information recording medium, the PPA and the modulation degree of the recording medium.

FIG. 5 is a graph showing the relationships among the cross-sectional profile shape of the groove in the recordable area, PPA, and Rtop which is the reflectance at a maximum 11T signal, obtained by simulations and experiments.

The PPA is the value in a non-recorded area and is not particularly defined in the OB Standards. However, it is preferable that the PPA be in the range of 0.04 to 0.11 according to the standard value of Normalized Push Pull Ratio (NPPR).

Because the Rtop is small when the cross-sectional profile of the groove is deep, the groove has to be made shallower than that of the previously mentioned pit, so that it is preferable that the groove have a substantially V-shaped cross-sectional profile. This is further because the groove having the V-shaped profile can be easily formed by the stamping molding.

It is necessary that the phase difference be in the range B shown in FIG. 5 to conform to a standard value in the OB Standards. The smaller the width of the groove, the larger the range B. However, there is a limitation to the width of the groove because the stamping molding is employed for the formation of the groove.

The phase difference caused by the difference in the film thickness is $0 \leq n_2(d_1' - d_2') \leq \lambda/8$ for the same reasons as in the case of the previously mentioned pits, and $d_1'$ has to satisfy the relationship $0.5\lambda/16 < n_1 d_1' < 4.5\lambda/16$ in order to set the optical phase difference in the range B.

For the same reasons as described previously, it is preferable that the difference in the film thickness be minimized, and can be made 0. However, in the recordable area, the deeper the groove, the smaller the deformation of the rear portion of the recorded 11T signal pulse. Therefore it is preferable that the difference in the film thickness be larger than 0, and the depth of the groove be made larger by an amount corresponding to the phase difference thereof.

The substrate of the optical information recording medium according to the present invention can be made of any materials for the substrate for the conventional optical information recording media. Examples of such materials are resins such as polycarbonate, polymethyl methacrylate, polyvinyl chloride, amorphous polyolefin, and epoxy polyester; and glass.

Examples of the dye for use in the light absorption layer of the optical information recording medium according to the present invention are cyanine dyes, phthalocyanine dyes, azulenium dyes, squarylium dyes, polymethyine dyes, pyrylium dyes, thiopyrylium dyes, indoaniline dyes, naphthoquinone dyes, anthraquinone dyes, triarylmethane dyes, aminium dyes, diimmonium dyes, metal complex dyes, and mixtures of the above dyes, but are not limited to these dyes.

A coating liquid for the light absorption layer can be prepared, for example, by dissolving any of the above dyes in a mixed solvent of (i) a fluorinated alcohol of the following formula (I):

A—CH$_2$OH　　　　　　　　　　　　(I)

wherein A represents CF$_3$— or H(CF$_2$—CF$_2$)$_l$— in which l is an integer of 1 to 3, and (ii) an alcohol of the following formula (II):

HO—CH$_2$CH$_2$—OR　　　　　　　　(II)

wherein R represents C$_n$H$_{2n+1}$—,

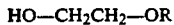

H, or C$_m$H$_{2m+1}$—O—C$_n$H$_{2n}$— in which n is an integer of 1 to 4 and m is an integer of 1 to 4, with the ratio by weight of the above-mentioned alcohol represented by the formula (II) to the fluorinated alcohol represented by the formula (I) being 20 wt.% or less.

The thus prepared coating liquid for the light absorption layer is coated on the substrate by the spin coating method. When the ratio of the alcohol represented by the formula (II) to the fluorinated alcohol represented by the formula (I) is more than 20 wt.%, the dye tends to be crystallized.

An undercoat layer can be provided between the light absorption layer and the substrate.

As the materials for the light reflection layer, Au, Ag, Al, or alloys of these metals can be employed.

Other features of this invention will become apparent in the course of the following description of exemplary embodiments, which are given for illustration of the invention and are not intended to be limiting thereof.

EXAMPLE 1

Formation of Prepits and Grooves on Substrate

On a substrate made of polycarbonate with a diameter of 120 mm, EFM-modulated information pits were formed in a ring-shaped ROM area of 46 mm to 80 mm from the center of the substrate. Each of the information pits had a substantially trapezoid cross-sectional profile, a width of 0.56 μm, and a depth of 1077 Å.

Grooves were also formed on the substrate in a ring-shaped recordable area of 80 mm to 116 mm from the center of the substrate. Each of the grooves had a substantially V-shaped cross-sectional profile, a width of 0.24 μm, and a depth of 466 Å.

Formation of Light Absorption Layer 2-methoxyethanol was added to 2,2,3,3-tetrafluoropropanol in an amount corresponding to 5 wt.% of the amount of the 2,2,3,3-tetrafluoropropanol to prepare a mixed solvent.

A cyanine dye (Trademark "NK2929", made by Japanese Research Institute for Photosensitizing Dyes Co., Ltd.) with the following formula (III) was dissolved in the above mixed solvent in an amount corresponding to 1.8 wt.% of the mixed solvent, so that a coating liquid for a light absorption layer was prepared:

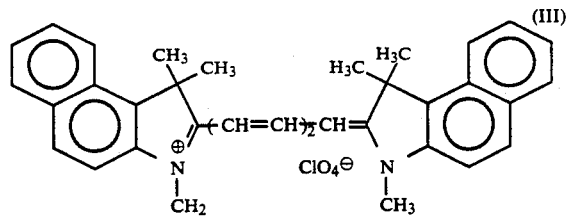

The above prepared coating liquid for the light absorption layer was coated by the spin coating method in an area in its entirety of the substrate outside a 38 mm diameter area of the substrate. Thus, a light absorption layer was formed on the substrate.

The thickness of the light absorption layer was about 1300 Å in any portions in the land portion, and in the bottom portions of the pits and grooves. The real number of the complex index of reflection of the light absorption layer was 2.7. Optical phase differences ΔS$_1$ and ΔS$_2$ were determined only by the depths of the pits and the grooves formed on the surface of the substrate, because the thickness of the light absorption layer was the same in any portions thereof. The optical phase difference in the pit portion was 3.49λ/8, which was in the range A as shown in FIG. 4. The optical phase difference in the groove portion was 1.51λ/8, which was in the range of B as shown in FIG. 5.

Formation of Light Reflection Layer and Protective Layer

A light reflection layer made of Au with a thickness of about 800 Å was provided on the above prepared light absorption layer.

Furthermore, a protective layer made of an ultraviolet curing resin with a thickness of about 3 μm was formed on the light reflection layer, whereby an optical information recording medium No. 1 of the present invention was fabricated.

CD format signals were recorded in the recordable area outside the 80 mm diameter area on the above obtained optical information recording medium No. 1 by a semiconductor laser beam with a wavelength of 782 nm, a recording power of 6.5 mW, and a line speed of 1.3 m/sec. The PPA, modulation degree, and Rtop of reproduced signals in the ROM area and those in the recordable area are shown in Table 1.

TABLE 1

|  | PPA | Modulation Degree (%) | Rtop (%) |
|---|---|---|---|
| ROM Area | 0.045 | 70.1 | 79.8 |
| Recordable Area | 0.058 | 68.6 | 73.2 |

It is obvious from the results shown in Table 1 that all of the above values of the optical information recording medium No. 1 are up to the OB Standards. Thus it was confirmed that a write-once-type CD having the ROM area can be fabricated without employing the separate coating method for coating the dye composition on the substrate.

EXAMPLE 2

Formation of Prepits and Grooves on Substrate

On a substrate made of polycarbonate with a diameter of 120 mm, EFM-modulated information pits were formed in a ring-shaped ROM area of 46 mm to 80 mm from the center of the substrate. Each of the information pits had a substantially trapezoid cross-sectional profile, a width of 0.56 μm, and a depth of 1150 Å.

Grooves were also formed on the substrate in a ring-shaped recordable area of 80 mm to 116 mm from the center of the substrate. Each of the grooves had a substantially V-shaped cross-sectional profile, a width of 0.24 μm, and a depth of 583 Å.

Formation of Light Absorption Layer 2-methoxyethanol was added to 2,2,3,3-tetrafluoropropanol in an amount corresponding to 5 wt.% of the amount of the 2,2,3,3-tetrafluoropropanol to prepare a mixed solvent.

A cyanine dye (Trademark "NK2929", made by Japanese Research Institute for Photosensitizing Dyes Co., Ltd.) with the following formula (III) and an aminium dye of the following formula (IV) were dissolved in the above mixed solvent, respectively in an amount corresponding to 1.8 wt.% and in an amount corresponding to 0.36 wt.% of the mixed solvent, so that a coating liquid for a light absorption layer was prepared:

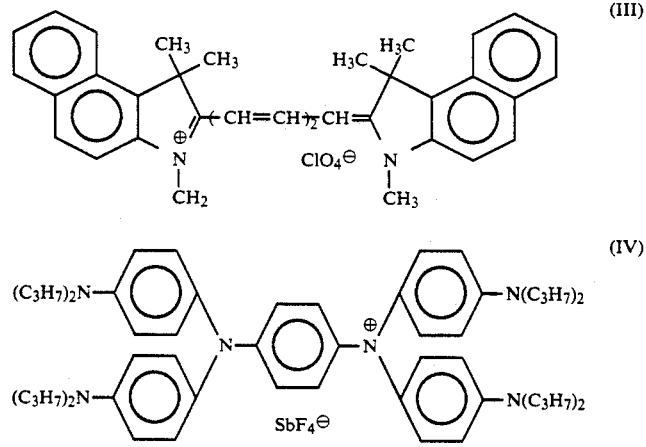

The above prepared coating liquid for the light absorption layer was coated by the spin coating method in an area in its entirety of the substrate outside a 38 mm diameter area of the substrate. Thus, a light absorption layer was formed on the substrate.

The thickness of the light absorption layer in the pit portion in the ROM area was 1280 Å; and that of the light absorption layer in the non-pit portion in the ROM area was 1200 Å. The thickness of the light absorption layer in the bottom of the groove portion in the recordable area was 1320 Å; and that of the light absorption portion in the land portion in the recordable area was 1200 Å.

The real number of the complex index of reflection of the light absorption layer was 2.6. The optical phase difference determined by the difference in the coated film layer thickness in the ROM area was $2.6 \times (1280 - 1200) \times 2 = 416$ Å. The optical phase difference in the pit portion formed on the substrate was $1.58 \times 1150 \times 2 = 3634$ Å. Therefore, $\Delta S_1 = 3634$ Å $- 416$ Å $= 3218$ Å $= 3.3\lambda/8$, which was in the range A shown in FIG. 4.

On the other hand, the optical phase difference determined by the difference in the coated film layer thickness in the recordable area was $2.6 \times (1320 - 1200) \times 2 = 624$ Å. The optical phase difference determined only by the groove was $1.58 \times 583 \times 2 = 1842$ Å. Therefore, $\Delta S_2 = 1842$ Å $- 624$ Å $= 1218$ Å $= 1.25\lambda/8$, which was in the range B shown in FIG. 5.

Formation of Light Reflection Layer and Protective Layer

A light reflection layer made of Au with a thickness of about 800 Å was provided on the above prepared light absorption layer.

A protective layer made of an ultraviolet curing resin with a thickness of about 3 μm was further provided on the above formed light reflection layer, whereby an optical information recording medium No. 2 of the present invention was fabricated.

CD format signals were recorded in the recordable area outside the 80 mm diameter area on the above obtained optical information recording medium No. 2 by a semiconductor laser beam with a wavelength of 782 nm, a recording power of 6.5 mW, and a line speed of 1.3 m/sec. The PPA, modulation degree, and Rtop of reproduced signals in the ROM area and those in the recordable area are shown in Table 2.

TABLE 2

| | PPA | Modulation Degree (%) | Rtop (%) |
|---|---|---|---|
| ROM Area | 0.058 | 71.0 | 79.2 |
| Recordable Area | 0.053 | 67.4 | 72.8 |

The deformation of recorded 11T signals in the recordable area of the optical information recording medium No. 2 was less than that of recorded 11T signals in the recordable area of the optical information recording medium No. 1. Thus it is considered that substantially no deformation of recorded 11T signals occurred in the recordable area of the optical information recording medium No. 2.

All the values of the optical information recording medium No. 2 shown in Table 2 are up to the OB Standards. Thus it was confirmed that a write-once-type CD having a ROM area can be fabricated without employing the separate coating method for coating the dye on the substrate.

EXAMPLE 3

Formation of Prepits and Grooves on Substrate

Information pits in accordance with the CD format were formed in a ring-shaped ROM area of 46 mm to 80 mm from the center of a substrate of polycarbonate with a diameter of 120 mm. Grooves were also formed in a ring-shaped recordable area of 80 mm to 116 mm on the above substrate.

Formation of Light Absorption Layer 2-methoxyethanol was added to 2,2,3,3-tetrafluoropropanol in an amount corresponding to 2 wt.% of the amount of the 2,2,3,3-tetrafluoropropanol to prepare a mixed solvent.

A cyanine dye (Trademark "NK2929", made by Japanese Research Institute for Photosensitizing Dyes Co., Ltd.) with the following formula (III) was dissolved in the above mixed solvent in an amount corresponding to 1.5 wt.% of the mixed solvent, so that a coating liquid for a light absorption layer was prepared:

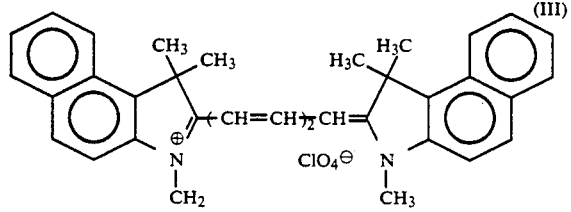
(III)

The above prepared coating liquid for the light absorption layer was coated by the spin coating method in an area in its entirety of the substrate outside a 38 mm diameter area of the substrate. Thus, a light absorption layer was formed on the substrate.

The thickness of the light absorption layer was about 1300 Å in any portions of the land portion, and in the bottom portions of the pits and grooves.

Formation of Light Reflection Layer and Protective Layer

A light reflection layer made of Au with a thickness of about 800 Å was provided on the above prepared light absorption layer.

Furthermore, a protective layer made of an ultraviolet curing resin with a thickness of about 3 μm was formed on the light reflection layer, whereby an optical information recording medium No. 3 of the present invention was fabricated.

CD format signals were recorded in the recordable area outside the 80 mm diameter area on the above obtained optical information recording medium No. 3 by a semiconductor laser beam with a wavelength of 782 nm, a recording power of 6.5 mW, and a line speed of 1.3 m/sec. The reproduced signal in the ROM area and that in the recordable area are shown in Table 3.

Furthermore, a comparative optical information recording medium was prepared by depositing Au directly on the ROM area thereof. The CD format signals were recorded on the above prepared medium in the same manner as on the optical information recording medium No. 3, so that the reproduced signal in the ROM area was compared with that of the above optical information recording medium No. 3.

TABLE 3

|  | Reflectance (%) | $I_{11}/I_{top}$ | $I_3/I_{top}$ |
| --- | --- | --- | --- |
| Recording Medium No. 3 (ROM area) | 81 | 0.66 | 0.41 |
| Recording Medium No. 3 (Recordable area) | 73 | 0.62 | 0.51 |
| Comparative Recording Medium | 86 | 0.69 | 0.42 |

It is obvious from Table 3 that a write-once-type CD having the ROM area can be obtained without employing the separate coating method for coating the dye on the substrate. Therefore, there is no unusable area on the recording medium and there is no decrease in the recording capacity of the recording medium.

What is claimed is:

1. An optical information recording medium including a ROM area and a recordable area, comprising:
   a light-transmitting substrate with prepits and/or guide grooves formed on the surface thereof, said prepits being in said ROM area, and said guide grooves being in said recordable area,
   a light absorption layer serving as a recording layer which comprises a dye as the main component overlaid on said light-transmitting substrate, and
   a light reflection layer comprising a metallic film overlaid on said light absorption layer, each of said prepits having a substantially trapezoid cross-sectional profile, the optical phase difference $\Delta S_1$ between a prepit portion and a non-prepit portion, represented by Equation: $\Delta S_1 = 2\{n_1 d_1 - n_2(d_1 - d_2)\}$, satisfying the condition of $2.5\lambda/8 < \Delta S_1 < 4\lambda/8$, wherein $d_1$ is the depth of said prepit, $d_2$ is the depth of said prepit portion at the interface between said light absorption layer and said light reflection layer, $n_1$ is the real number of the complex index of reflection of said light-transmitting substrate, $n_2$ is the real number of the complex index of reflection of said light absorption layer, and $\lambda$ is the wavelength of a light beam for reproduction, each of said guide grooves having a substantially V-shaped cross-sectional profile, and the optical phase difference $\Delta S_2$ between a groove portion and a land portion, represented by Equation: $\Delta S_2 = 2\{n_1 d_1' - n_2(d_1' - d_2')\}$, satisfying the condition: $0.5\lambda/8 < \Delta S_2 < 2.5\lambda/8$, wherein $d_1'$ is the depth of said guide groove and $d_2'$ is the depth of said guide groove portion at the interface between said light absorption layer and said light reflection layer.

2. The optical information recording medium as claimed in claim 1, wherein said optical phase differences $\Delta S_1$ and $\Delta S_2$ satisfy the following conditions:
   $2.5\lambda/16 < n_1 d_1 < 6\lambda/16$, and
   $0 \leq n_2(d_1 - d_2) \leq \lambda/8$; and
   $0.5\lambda/16 \leq n_1 d_1' \leq 4.5\lambda/16$, and
   $0 \leq n_2(d_1' - d_2') \leq \lambda/8$.

3. The optical information recording medium as claimed in claim 1, wherein said light absorption layer is formed on said light-transmitting substrate by a method comprising the steps of:
   coating on said light-transmitting substrate a solution comprising as the main components a dye and a solvent comprising a mixture of a fluorinated alcohol of formula (I) and an alcohol of formula (II), with the amount of the fluorinated alcohol of formula (II) being 20 wt.% or less with respect to the amount of the fluorinated alcohol of formula (I):

$$A-CH_2OH \quad (I)$$

wherein A represents $CF_3-$ or $H(CF_2-CF_2)_l-$ in which l is an integer of 1 to 3; and $$HO-CH_2CH_2-OR \quad (II)$$

wherein R represents $C_nH_{2n+1}-$,

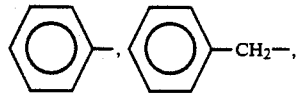

H, or $C_mH_{2m+1}-O-C_nH_{2n}-$ in which n is an integer of 1 to 4, and m is an integer of 1 to 4; and drying said solution coated on said light-transmitting substrate.

4. The optical information recording medium as claimed in claim 3, wherein said light absorption layer is formed by coating said solution by the spin coating method.

5. The optical information recording medium as claimed in claim 1, wherein said light-transmitting substrate is made of a material selected from the group consisting of polycarbonate, polymethyl methacrylate, polyvinyl chloride, amorphous polyolefin, epoxy polyester and glass.

6. The optical information recording medium as claimed in claim 1, wherein said dye for use in said light absorption layer is selected from the group consisting of cyanine dyes, phthalocyanine dyes, azulenium dyes, squarylium dyes, polymethyine dyes, pyrylium dyes, thiopyrylium dyes, indoaniline dyes, naphthoquinone dyes, anthraquinone dyes, triarylmethane dyes, aminium dyes, diimmonium dyes, metal complex dyes, and mixtures of the above dyes.

7. The optical information recording medium as claimed in claim 1, further comprising a protective layer formed on said light reflection layer.

8. A method of fabricating an optical information recording medium including a ROM area and a recordable area, which comprises a light-transmitting substrate with prepits and/or guide grooves formed on the surface thereof, said prepits being in said ROM area, and said guide grooves being in said recordable area, a light absorption layer serving as a recording layer which comprises a dye as the main component overlaid on said light-transmitting substrate, and a light reflection layer comprising a metallic film overlaid on said light absorption layer, comprising the steps of:

coating on said light-transmitting substrate a solution comprising as the main components a dye and a solvent comprising a mixture of a fluorinated alcohol of formula (I) and an alcohol of formula (II), with the amount of the fluorinated alcohol of formula (II) being 20 wt.% or less formula (I):

$$A-CH_2OH \quad (I)$$

wherein A represents $CF_3-$ or $H(CF_2-CF_2)_l-$ in which l is an integer of 1 to 3; and $$HO-CH_2CH_2-OR \quad (II)$$

wherein R represents $C_nH_{2n+1}-$,

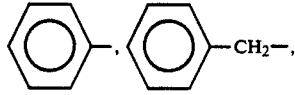

H, or $C_mH_{2m+1}-O-C_nH_{2n}-$ in which n is an integer of 1 to 4, and m is an integer of 1 to 4; and drying said solution coated on said light-transmitting substrate.

9. The method of fabricating an optical information recording medium as claimed in claim 8, wherein said light absorption layer is formed by coating said solution by the spin coating method.

10. The method of fabricating an optical information recording medium as claimed in claim 8, wherein each of said prepits has a substantially trapezoid cross-sectional profile, the optical phase difference $\Delta S_1$ between a prepit portion and a non-prepit portion, represented by Equation: $\Delta S_1 = 2\{n_1 d_1 - n_2(d_1 - d_2)\}$, satisfies the condition of $2.5\lambda/8 < \Delta S_1 < 4\lambda/8$, wherein $d_1$ is the depth of said prepit, $d_2$ is the depth of said prepit portion at the interface between said light absorption layer and said light reflection layer, $n_1$ is the real number of the complex index of reflection of said light-transmitting substrate, $n_2$ is the real number of the complex index of reflection of said light absorption layer, and $\lambda$ is the wavelength of a light beam for reproduction, each of said guide grooves has a substantially V-shaped cross-sectional profile, and the optical phase difference $\Delta S_2$ between a groove portion and a land portion, represented by Equation: $\Delta S_2 = 2\{n_1 d_1' - n_2(d_1' - d_2')\}$, satisfies the condition: $0.5\lambda/8 < \Delta S_2 < 2.5\lambda/8$, wherein $d_1'$ is the depth of said guide groove and $d_2'$ is the depth of said guide groove portion at the interface between said light absorption layer and said light reflection layer.

* * * * *